US011565790B2

(12) United States Patent
Schiller et al.

(10) Patent No.: US 11,565,790 B2
(45) Date of Patent: Jan. 31, 2023

(54) LOW-NOISE MULTI-PROPELLER SYSTEM

(71) Applicant: UNITED STATES OF AMERICA AS REPRESENTED BY THE ADMINISTRATOR OF NASA, Washington, DC (US)

(72) Inventors: Noah H. Schiller, Yorktown, VA (US); Nikolas S. Zawodny, Williamsburg, VA (US); Kyle A. Pascioni, Virginia Beach, VA (US); Stephen A. Rizzi, Newport News, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 455 days.

(21) Appl. No.: 16/597,499

(22) Filed: Oct. 9, 2019

(65) Prior Publication Data
US 2020/0108913 A1 Apr. 9, 2020

Related U.S. Application Data

(60) Provisional application No. 62/743,005, filed on Oct. 9, 2018.

(51) Int. Cl.
*B64C 11/50* (2006.01)

(52) U.S. Cl.
CPC .................. *B64C 11/50* (2013.01)

(58) Field of Classification Search
CPC ..... B64C 11/48; B64C 11/50; B64C 2220/00; B64C 11/008; B64C 11/46; B64C 2230/14; B64C 2230/24; B64C 27/32; B64C 2201/108
See application file for complete search history.

(56) References Cited

U.S. PATENT DOCUMENTS

| 5,221,185 A | 6/1993 | Pla et al. |
| 6,671,590 B1 | 12/2003 | Betzina et al. |
| 9,442,496 B1 * | 9/2016 | Beckman ......... G10K 11/17857 |
| 10,315,759 B2 * | 6/2019 | Nemovi ................ B64C 39/024 |

(Continued)

FOREIGN PATENT DOCUMENTS

| CN | 109625259 A * | 4/2019 | ............. B64C 27/08 |
| WO | WO-2018084261 A1 * | 5/2018 | ............. B64C 17/00 |
| WO | WO-2019232535 A1 * | 12/2019 | ............. B64C 11/20 |

OTHER PUBLICATIONS

Johnston etal, Propeller Signatures and Their Use, Nov. 1981, AIAA, vol. 18, pp. 934-942 (Year: 1981).*

(Continued)

*Primary Examiner* — Joshua J Michener
*Assistant Examiner* — Ryan Andrew Yankey
(74) *Attorney, Agent, or Firm* — M. Bruce Harper; Andrea Z. Warmbier; Robin W. Edwards

(57) ABSTRACT

A low-noise multi-propeller system includes at least two propellers, each propeller including at least two blades. The propellers rotate in a first direction and define an angular phase relative to one another. A drive system corotates the propellers at substantially equal rotational rates in the first direction. The propellers are substantially phase-locked at a predefined relative phase offset that reduces the overall sound power of the fundamental tone at a blade passage frequency.

21 Claims, 12 Drawing Sheets

(56) References Cited

U.S. PATENT DOCUMENTS

| | | | |
|---|---|---|---|
| 11,164,553 B2* | 11/2021 | Greenberg | B64C 39/024 |
| 2016/0033073 A1 | 3/2016 | Beckman | |
| 2016/0244158 A1* | 8/2016 | Fredericks | B64D 27/24 |
| 2017/0174319 A1 | 6/2017 | Beckman et al. | |
| 2017/0247107 A1* | 8/2017 | Hauer | B64D 35/06 |
| 2017/0297679 A1* | 10/2017 | Elliott | B64D 35/08 |
| 2019/0185149 A1* | 6/2019 | Pantalone | B64C 39/024 |
| 2019/0256218 A1* | 8/2019 | Correa Hamill | B64C 27/12 |

OTHER PUBLICATIONS

Blunt, "Optimization and adaptive control of aircraft propeller synchrophase angles", 2012, University of Adelaide (Year: 2012).*

Bies et al., "Engineering Noise Control," E & FN Spon, London, 1996, pp. 198.

Farassat, "Theory of Noise Generation from Moving Bodies with an Application to Helicopter Rotors," NASA TR-R-451, 1975, pp. 1-59.

FFOWOS. "Review Lecture Anti-sound," Proc. R. Soc. Lend. A, 1984, pp. 63-88, 395.

Grosvelo, "Calibration of the Structural Acoustics Loads and Transmission Facility at NASA Langley Research Center," InterNoise 99 Proceedings, Dec. 6-8, 1999, pp. 1541-1546, Ft. Lauderdale, FL.

Ianniello, "The Ffowcs Williams-Hawkings Equation for Hydroacoustic Analysis of Rotating Blades. Part 1. The rotpote," J. Fluid Mech., 2016, pp. 345-388, vol. 797.

Johnson et al., "Concept Vehicles for VTOL Air Taxi Operations," AHS Technical Conference on Aeromechanics Design for Transformative Vertical Flight, (2018), pp. 1-24, San Francisco, CA.

Kinsler et al., "Fundamentals of Acoustics. 4th edition," John Wiley & Sons, 2000, pp. 179-181.

Magliozzi, "Synchrophasing for Cabin Noise Reduction of Propeller-Drive Airplanes" AIAA 8th Aeroacoustics Conference, Apr. 11-13, 1983. pp. 1 -7, Paper 83-0717, Atlanta, Georgia.

Nelson et al., "The Minimum Power Output of Free Field Point Sources and the Active Control of Sound," J. of Sound and Vibration, 1987, pp. 397-414. vol. 116, (3).

Nguyen et al., "A Users Guide for the NASA ANOPP Propeller Analysis System," NASA CR 4768, Feb. 1997, pp. 1-96.

Silva et al., "VTOL Urban Air Mobility Concept Vehicles for Technology Development," Aviation Technology, Integration and Operations Conference Proceedings, Jun. 25-29, 2018, Paper AIAA 2018-3847, pp. 1-16, Atlanta, GA.

Pascioni et al.,"Tonal Noise Prediction of an Unmanned Aerial Vehicle," 24th AIAA/CEAS Aeroacoustics Conference Proceedings, Jun. 25-29, 2018, Paper AIAA 2018-2951, pp. 1-18, Atlanta, GA.

Pascioni et al., "Auralization of an Unmaned Aerial Vehicle Under Propeller Phase Control," InterNoise 2018 Proceedings, Aug. 26-29, 2018, pp. 63-88, Chicago, IL.

Pascioni et al., "Noise Reduction Potential of Phase Control for Distributed Propulsion Vehicles," AIAA SciTech Forum end Exposition Proceedings Paper AIAA 2619-1069, Jan. 7-11, 2019, pp. 1-16, San Diego, CA.

Zawodny et al., "Investigation of Rotor-airframe Interaction Noise Associated with Small-scale Rotary-wing Unmanned Aircraft Systems," American Helicooter Society 73rd Annual Forum Proceedinos, May 2017, pp. 1-17, Ft. Worth, TX.

Patterson et al., "Propeller Phase Synchronization for Small Distributed Electric Vehicles," AIAA SciTech Forum and Exposition Proceedings, Jan. 7-11, 2019, pp. 1-14, Paper AIAA 2019-1458, San Diego, CA.

Stephenson et al., "Effects of Flow Recirculation on Unmanned Aircraft System (UAS) Acoustic Measurements in Closed Anechoic Chambers (L)," Journal of the Acoustical Society of America, Mar. 2019. pp. 1153-1155, vol. 145, (3).

Zorumski, "Aircraft Noise Prediction Program Theoretical Manual, Part 1," 1982, pp. 5-1-7.1-24, NASA TM-83199.

Zawodny et al., "Acoustic Characterization and Prediction of Representative, Small-scale Rotary-wing Unmanned Aircraft Systems Components." American Helicopter Society 72nd Annual Forum, May 2016, pp. 1-15.

Turkdogru et al., "Determination of Geometric Farfieid for Ducted and Unducted Rotors," International Journal of Aeroacoustics, 2012, pp. 607-628, vol. 11, (5&6).

Tinney et al., "Multirotor Drone Noise at Static Thrust," AIAA Journal, Jul. 2018, pp. 2816-2826, vol. 56, (7).

Kottapalli, Sesi, et al., "Analytical Performance, Loads, and Aeroelastic Stability of a Full-Scale Isolated Proprotor," AHS Technical Conference on Aeromechanics Design for Transformative Vertical Flight, Jan. 16-19, 2018, pp. 1-26, San Francisco, CA.

* cited by examiner

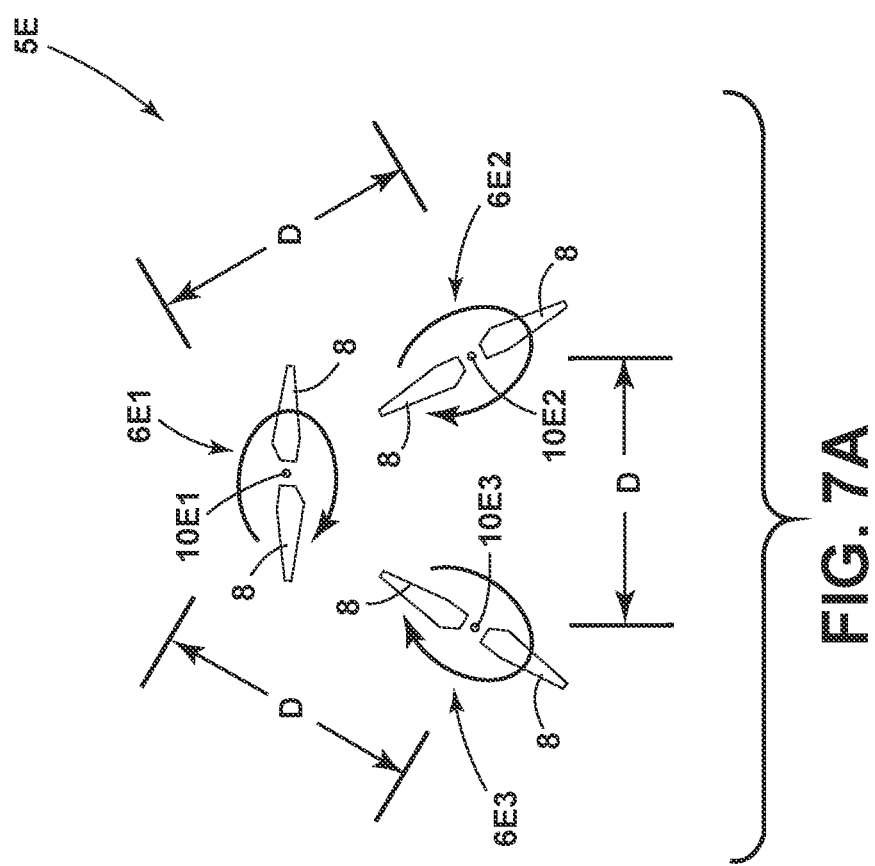

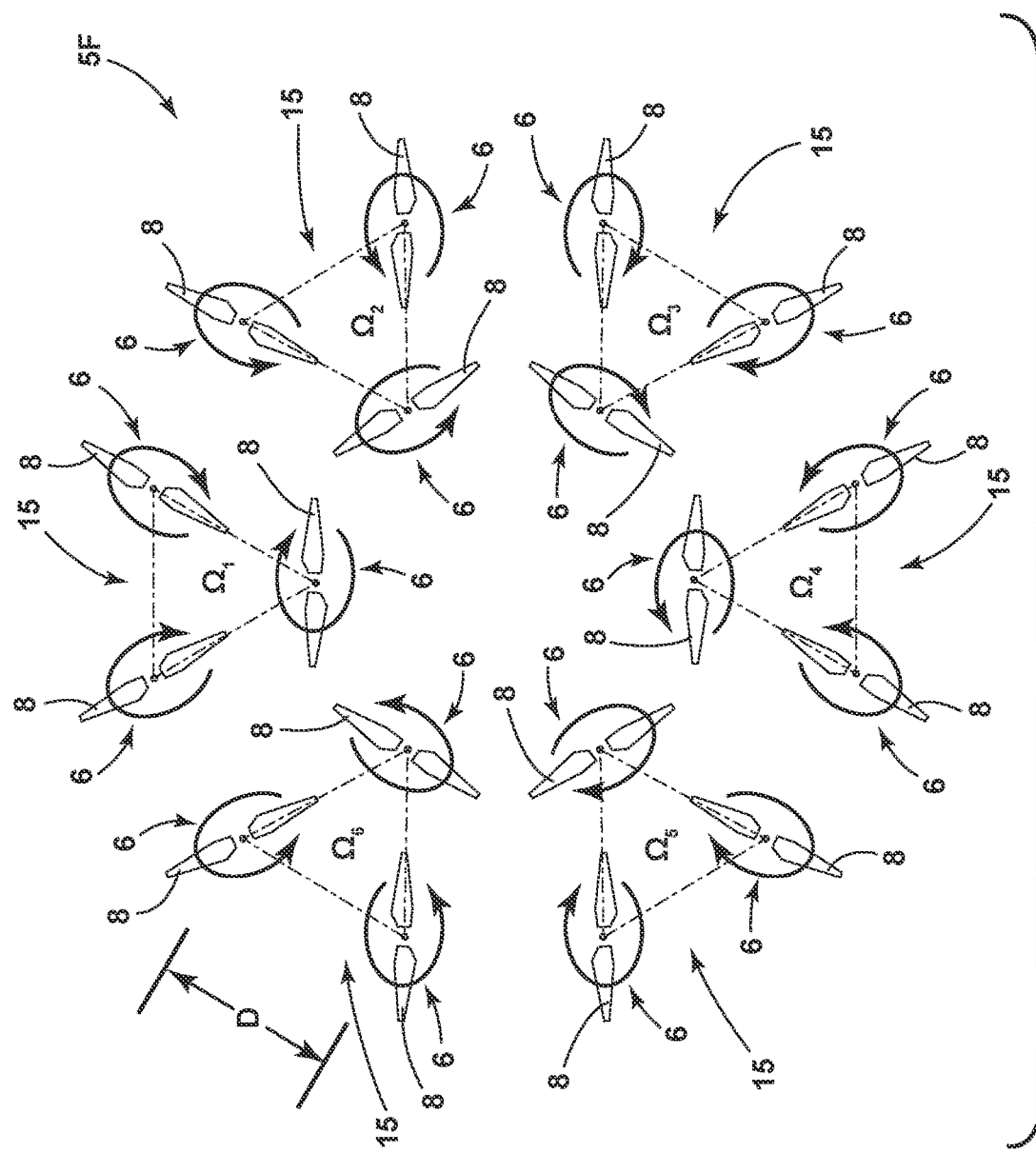

LOW-NOISE MULTI-PROPELLER SYSTEM

CROSS-REFERENCE TO RELATED PATENT APPLICATION

This application claims the benefit under 35 U.S.C. § 119(e) of U.S. Provisional Patent Application No. 62/743,005, filed Oct. 9, 2018, entitled "LOW-NOISE MULTI/ROTOR/PROPELLER SYSTEM," which is incorporated herein by reference in its entirety.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Various types of manned and unmanned aerial vehicles have been developed. Aerial vehicles may be configured to provide forward flight and/or to take-off and land vertically. This may be achieved with one or more rotors, propellers, or fans to provide lift or thrust. Depending on the vehicle configuration, vehicle body, and flight condition, the rotating actuators, (collectively "propellers" herein) may operate in a range of conditions from axial to nonaxial flight with the freestream flow substantially parallel or perpendicular with the propeller axes, respectively. Noise from the propellers may be significant, and may constitute a barrier for operations, particularly in populated areas.

Propeller noise may be broadly divided into three categories including: 1) impulsive noise; 2) rotational noise; and 3) broad band noise. Rotational noise is caused by both the thrust (and torque) produced by the propeller and by the displacement of air as the blades rotate. Rotational noise can be steady (relative to an observer) on the rotating blade, or unsteady due to a non-zero in-flow angle or flow restriction for example. Rotational noise is tonal, with well-defined peaks in the measured sound pressure spectrum at the blade passage frequency and at its harmonics. In general, the blade passage frequency (in Hertz) is equal to the product of the rotational rate (in revolutions per minute, RPM) and the number of blades divided by 60.

BRIEF SUMMARY OF THE INVENTION

One aspect of the present invention is a system including two or more similar or substantially identical propellers that are located adjacent to each other, and operate at the same rotation rate and rotation direction with a predetermined angular phase offset between each propeller. The angular phase offset is uniquely defined based on the number of blades, and in some cases the number of propellers, to achieve a global (i.e. averaged in all directions) reduction in sound power of the fundamental tone at the blade passage frequency. The propellers are preferably phase-locked, and have the same rotation rate and rotation direction with a predetermined phase offset between each propeller. The propellers may be mechanically driven (e.g. utilizing belts/shafts) to maintain a desired phase relationship, or phase control can be achieved electronically (e.g. using a master/slave configuration and a control system to fix the relative phase between the propellers). In many cases, the optimal phase offset is 180-degrees divided by the number of blades of the propellers. For example, if the propellers have two blades, the optimal phase offset is exactly or about 90-degrees to thereby reduce sound power at the fundamental tone at the blade passage frequency. If the propellers have three blades, the optimal phase offset is 60-degrees. However, the optimal phase offset may be different for some configurations. For example, if the propeller system contains an odd number of propellers positioned near the vertices of a normal polygon (i.e. triangle, pentagon, etc.), then the preferred phase offset angle for adjacent propellers is: $\Delta\psi_r = 180°/N_b - 180°/(N_p N_b)$ where $N_b$ is the number of blades and $N_p$ is the number of propellers. For two-bladed propellers in a triangle, the preferred phase offset is 60-degrees. The configuration of the propellers reduces far-field pressure levels due to the near-field acoustic interaction between the propellers. Adjacent propellers are phased to radiate less efficiently than a single acoustic source (e.g. a monopole). Additional propellers may also be phased to provide acoustic interaction that reduces the noise (sound pressure level) of the propellers in operation.

Another aspect of the present disclosure is a low-noise multi-propeller system for aerial vehicles. The system includes at least two propellers, each propeller defining an axis of rotation and including at least two blades, wherein the at least two propellers have equal numbers of blades. The at least two propellers corotate about their respective axes of rotation in a first direction and define an angular phase relative to one another. The multi-propeller system further includes a drive system configured to corotate the at least two propellers at substantially equal rotational rates in the first direction. As discussed herein, the drive system may be installed within a body of an aerial vehicle. The at least two propellers are configured to be phase-locked at a predefined relative phase offset that reduces a fundamental tone at a blade passage frequency. The blade passage frequency is proportional to rotational rate of the blades and a number of blades of each propeller. The predefined relative phase offset may be substantially equal to 180-degrees divided by the number of blades of the at least two propellers. The axes of rotation of the at least two propellers may be substantially parallel. The at least two propellers may consist of two propellers, three propellers, four propellers, or more. The axes of the two or more propellers may be spaced apart a distance that is preferably one half of an acoustic wavelength of the fundamental tone or less. In general, optimizing noise reduction according to the present disclosure requires the separation distance between adjacent axes to be less than one half of the acoustic wavelength. However, the separation distance between non-adjacent axes can be much larger. The at least two propellers may have substantially identical sizes and shapes.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

In the drawings:

FIG. 7A is a schematic top plan view of a low-noise multi-propeller system according to another aspect of the present disclosure;

FIG. 7B is a schematic top plan view of a low-noise multi-propeller system according to another aspect of the present disclosure;

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, aerial vehicles 1A-1G generally include vehicle bodies and powered drives (e.g. engines, motors) that drive a plurality of propellers 2 to provide lift and/or thrust. As used herein, the term "propeller" generally refers to a rotatable device or assembly having one or more blades. Thus, as used herein, the term "propeller" may refer to airplane propellers 2 (e.g. aircraft 1A) and to propellers 2A of, for example, aircraft 1B and 1D. Furthermore, the term "propeller" as used herein may also refer to rotors, fans, turbines, and other rotating assemblies having blades. The low-noise propeller system and method of the present disclosure may be utilized in connection with virtually any type of vehicle or device, including any of the vehicles 1A-1G of FIG. 1, and other vehicles or devices having at least two propellers 2 that rotate in the same direction at substantially equal rotational rates or speeds.

Figure 1A:
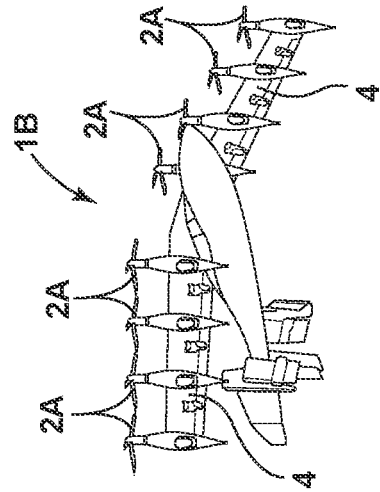
FIG. 1A is a schematic isometric view of a multi-propeller aerial vehicle.
Figure 1B:
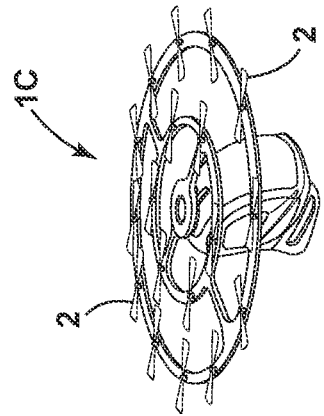
FIG. 1B is a schematic isometric view of a multi-propeller aerial vehicle.
Figure 1C:
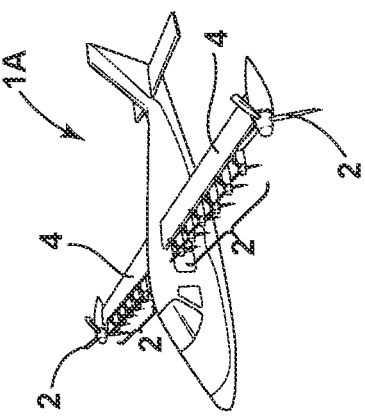
FIG. 1C is a schematic isometric view of a multi-propeller aerial vehicle.
Figure 1D:
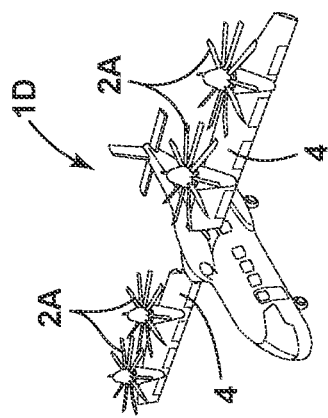
FIG. 1D is a schematic isometric view of a multi-propeller aerial vehicle.
Figure 1F:
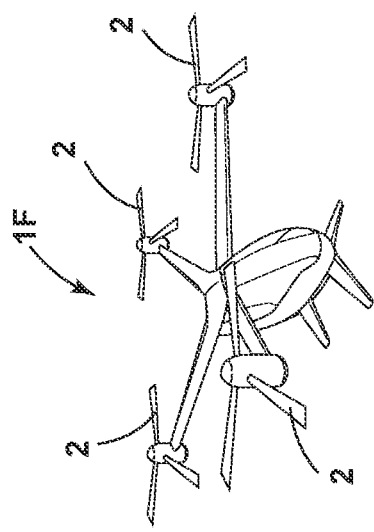
FIG. 1F is a schematic isometric view of a multi-propeller aerial vehicle.
Figure 1E:
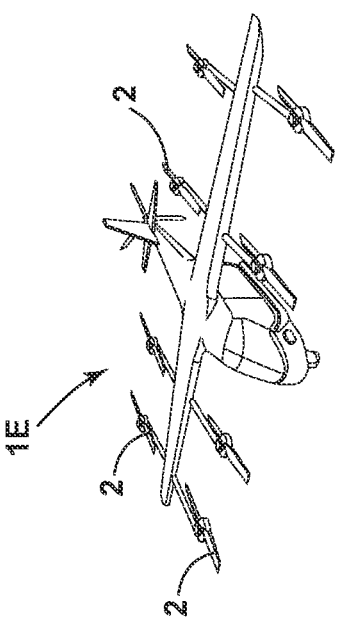
FIG. 1E is a schematic isometric view of a multi-propeller aerial vehicle.
Figure 1G:
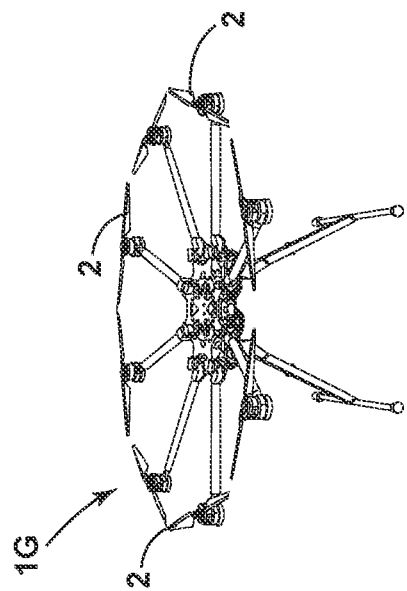
FIG. 1G is a schematic isometric view of a multi-propeller aerial vehicle.
Figure 2:
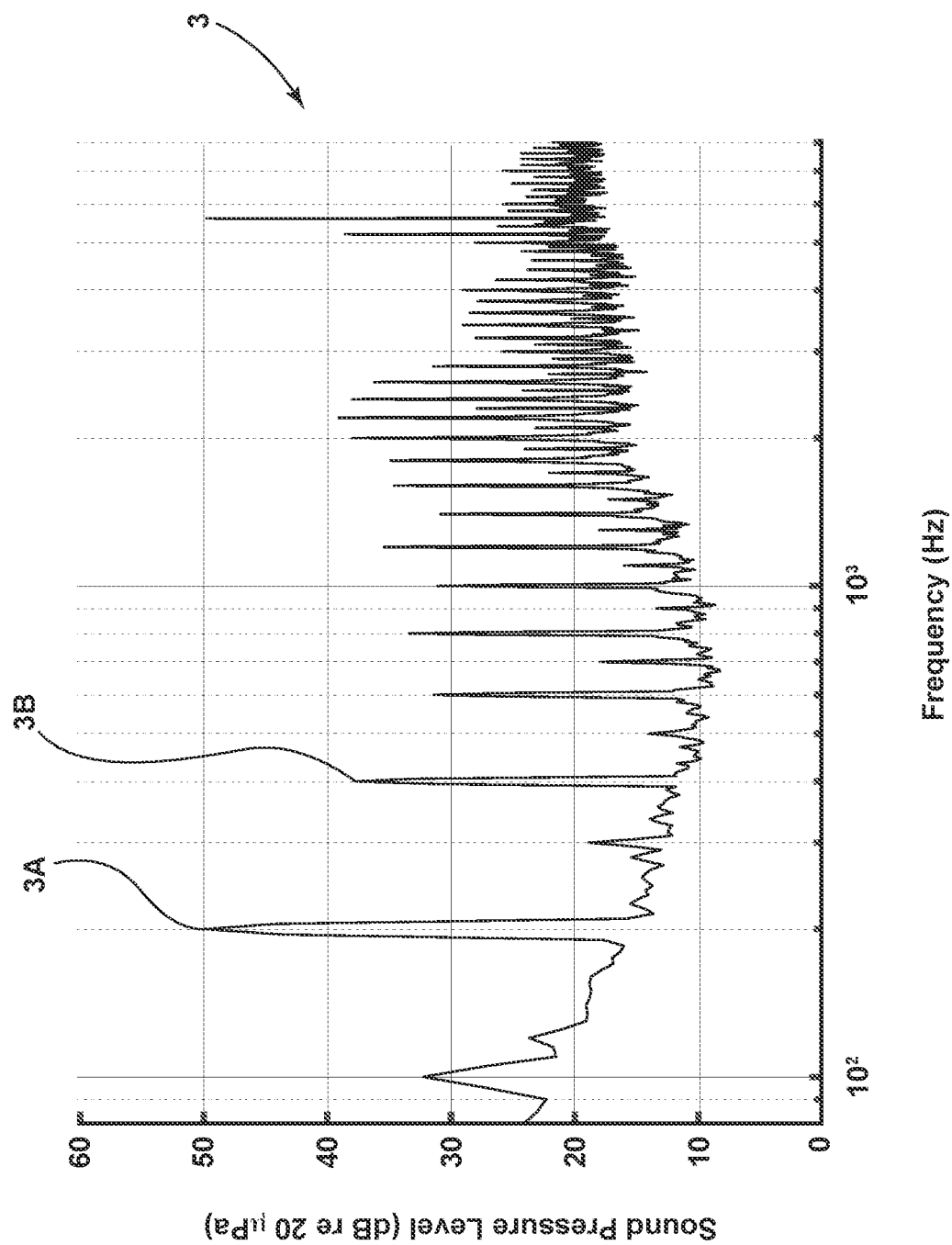
FIG. 2 is a graph showing far-field sound pressure level for a small propeller with two blades operating at 6,000 RPM.

With reference to FIG. 2, rotational noise 3 of a single propeller is tonal, and typically includes well-defined peaks in the measured sound pressure spectrum at the blade passage frequency and at its harmonics. FIG. 2 shows measured sound pressure level for a single small isolated propeller on a test stand. Specifically, FIG. 2 shows the far-field sound pressure level for a small propeller with two blades operated at 6,000 RPM. Harmonic noise dominates at the blade passage frequency of 200 Hz (peak 3A) and at the first harmonic, 400 Hz (3B). It will be understood that other propellers may generate sound pressure levels having similar characteristics.

Figure 3:
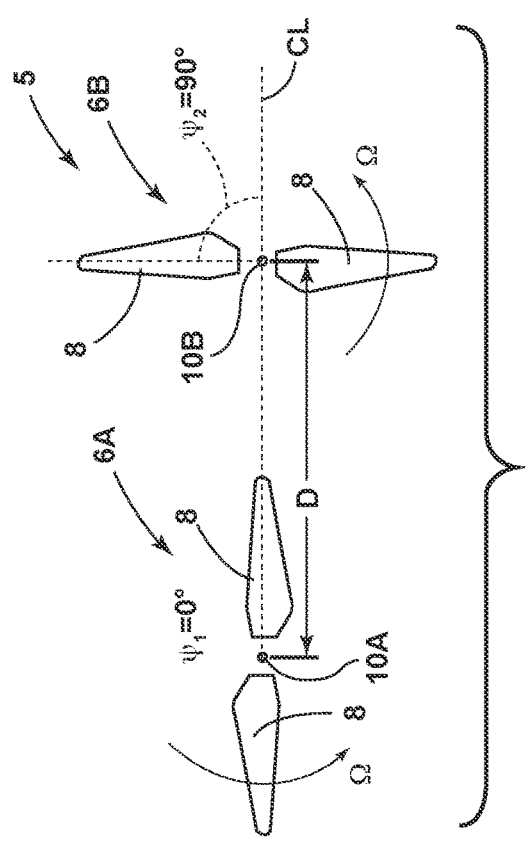
FIG. 3 is a schematic top plan view of a low-noise multi-propeller system according to one aspect of the present disclosure.

With reference to FIG. 3, a propeller system 5 according to one aspect of the present disclosure includes a first propeller 6A having two blades 8 that are configured to rotate about an axis of rotation 10A, and a second propeller 6B having two blades 8 that rotate about a second axis of rotation 10B. In this sense, propellers 6A and 6B are configured to define axes of rotation 10A and 10B. Propellers 6A and 6B may be substantially identical. The axes of rotations 10A and 10B (or 'axes") form a center line "CL," and the axes 10A and 10B are shown spaced-apart by a distance "D," i.e., as measured between the axes of rotation. It will be understood that the axes of rotation 10A and 10B do not have to be perfectly aligned. The distance D is preferably relatively small, and in particular is preferably a distance that is one half of an acoustic wavelength of the fundamental tone or less (e.g., are spaced-apart a distance that is less than one half an acoustic wavelength of a fundamental tone at the blade passage frequency.) The distance D is preferably as small as possible taking into account the design limitations (e.g. sufficient clearance to avoid physical or aerodynamic interaction) of the system.

FIG. 3 is a schematic plan view in which the propellers 6A and 6B corotate in the same counterclockwise direction at the same rotational rate $\Omega$. It will be understood that the propellers 6A and 6B may corotate in a clockwise direction that is opposite direction $\Omega$. The angular phase difference (difference in angular position) between the propellers 6A and 6B is preferably about 90-degrees. The propellers 6A and 6B corotate in the same direction at substantially the same rotational rate at a predefined angular phase offset ($\psi 2 - \psi 1$) of about 90-degrees. As discussed in more detail below, the propellers 6A and 6B are phase-locked to define an angular phase offset and rotate at substantially the same rotational rate to thereby maintain the 90-degree phase offset regardless of the rotational rates of the propellers 6A and 6B. This causes sound produced by the propellers 6A and 6B to add destructively similar to an acoustic dipole, which results in reduced radiation efficiency and reduced noise. As discussed in more detail below, this effect is not limited to a two propeller system as shown in FIG. 3. It will be understood that the rotational rates and angular phase offset may vary somewhat from the preferred arrangement. Thus, the rotational rates of the propellers 6A and 6B does not have to be identical in order to reduce noise, and the phase offset does not have to be exactly 90-degrees to reduce the noise. For example, the rotational rate or speed of the propellers 6A and 6B could vary by about 0.1%, about 0.5%, about 1%, or more relative to the rotation rate of the other propeller, and the relative phase offset could be in a range of about 85-degrees to about 95-degrees, about 80-degrees to about 110-degrees, about 70-degrees to about 120-degrees, etc. Typically, the sound reduction benefit (reduction in sound pressure level) is reduced at least somewhat if the rotational rates of the propellers are not equal and/or if the predefined phase offset is not equal to the preferred phase offset. However, reductions in noise are possible in devices and systems that vary from the preferred or "ideal" disclosed herein.

Figure 4:
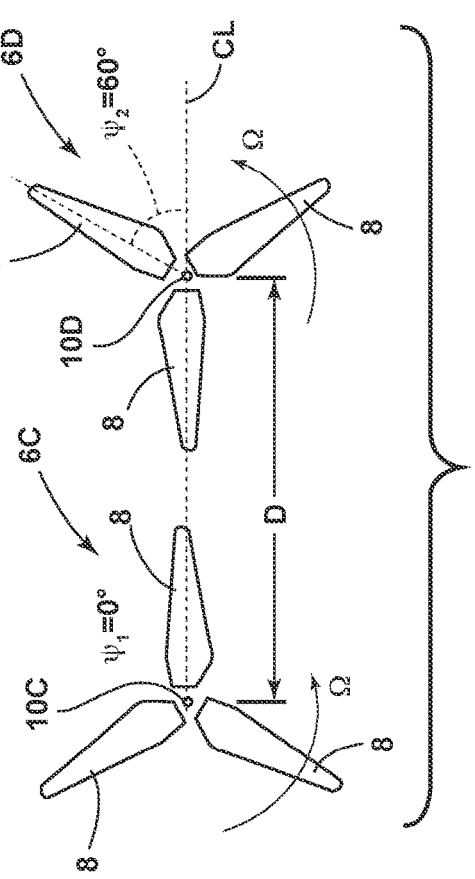
FIG. 4 is a schematic top plan view of a low-noise multi-propeller system according to another aspect of the present disclosure.

With reference to FIG. 4, a propeller system 5A according to another aspect of the present disclosure includes first and second propellers 6C and 6D, respectively. Each propeller 6C and 6D includes three blades 8 that are disposed at equal angles (120-degrees) relative to one another. Propeller 6C rotates about an axis of rotation 10C and propeller 6D rotates about an axis of rotation 10D. Propellers 6C and 6D are thus configured to define axes of rotation 10C and 10D. The axis 10C is spaced-apart from axis 10D along a center line CL by a distance D. The distance D is preferably less than one half of an acoustic wavelength of the fundamental tone. The propellers 6C and 6D are phased-locked, and rotate at substantially the same rotational rates in the same direction (clockwise or counterclockwise) regardless of the rotational rates S) of the propellers 6C and 6D. The relative phase offset between the propellers 6C and 6D is preferably about 60-degrees. The propeller system 5A reduces tonal noise at the blade passage frequency. It will be understood that the rotational rates or speeds of the propellers do not have to be exactly equal, and the relative phase offset may vary from the preferred phase offset.

Figure 5:
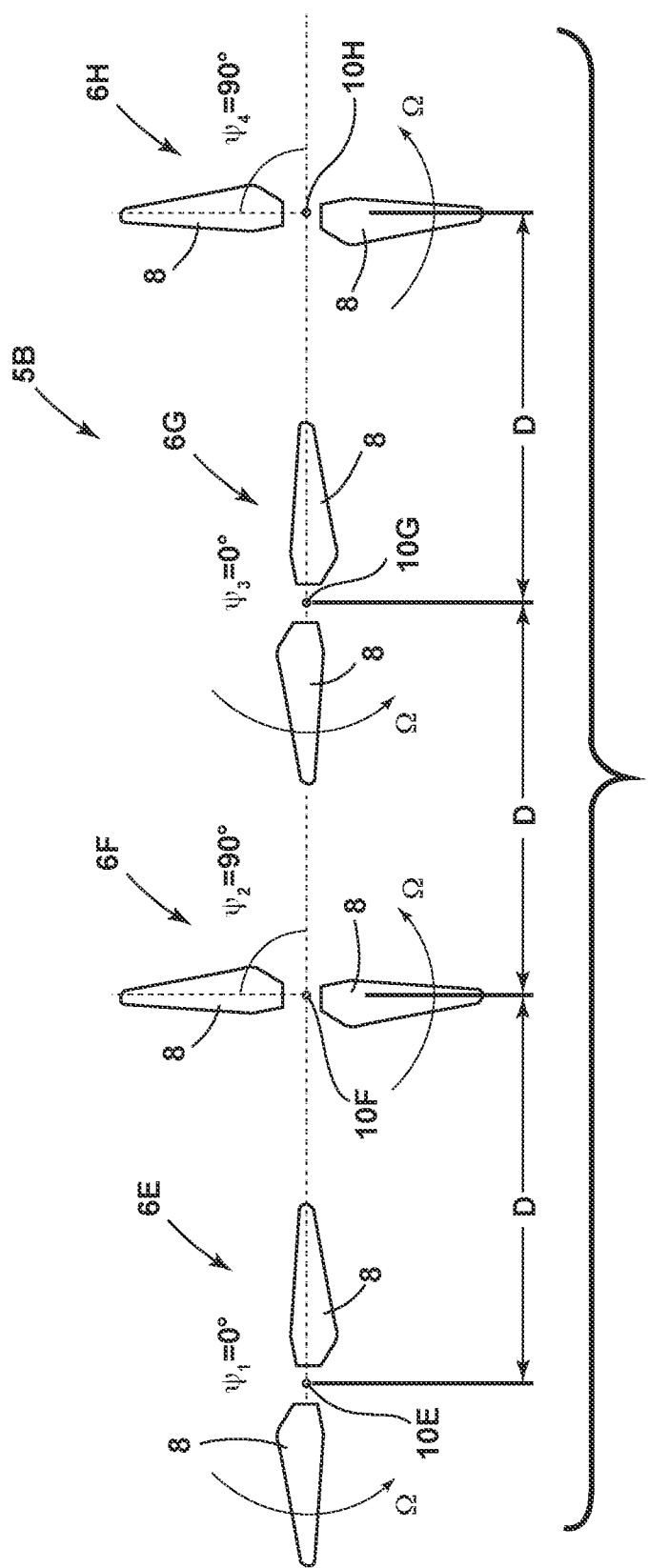
FIG. 5 is a schematic top plan view of a low-noise multi-propeller system according to another aspect of the present disclosure.

With further reference to FIG. 5, a propeller system 5B includes first, second, third, and fourth propellers 6E-6H, respectively, that rotate about (or are configured to define) axes of rotation 10E-10H, respectively. Propellers 6E-6H may be substantially identical. The axes 10E-10H are disposed along a center line CL, and the axes 10E-10H are spaced-apart relative to one another by a distance D that is preferably less than one half of an acoustic wavelength of the fundamental tone. The propellers 6E-6H corotate in the same rotational direction preferably at about the same rotational rates, and each of the propellers 6E-6H includes two blades 8. The propellers 6E-6H preferably have a phase offset of about 90-degrees relative to adjacent propellers.

Figure 6:
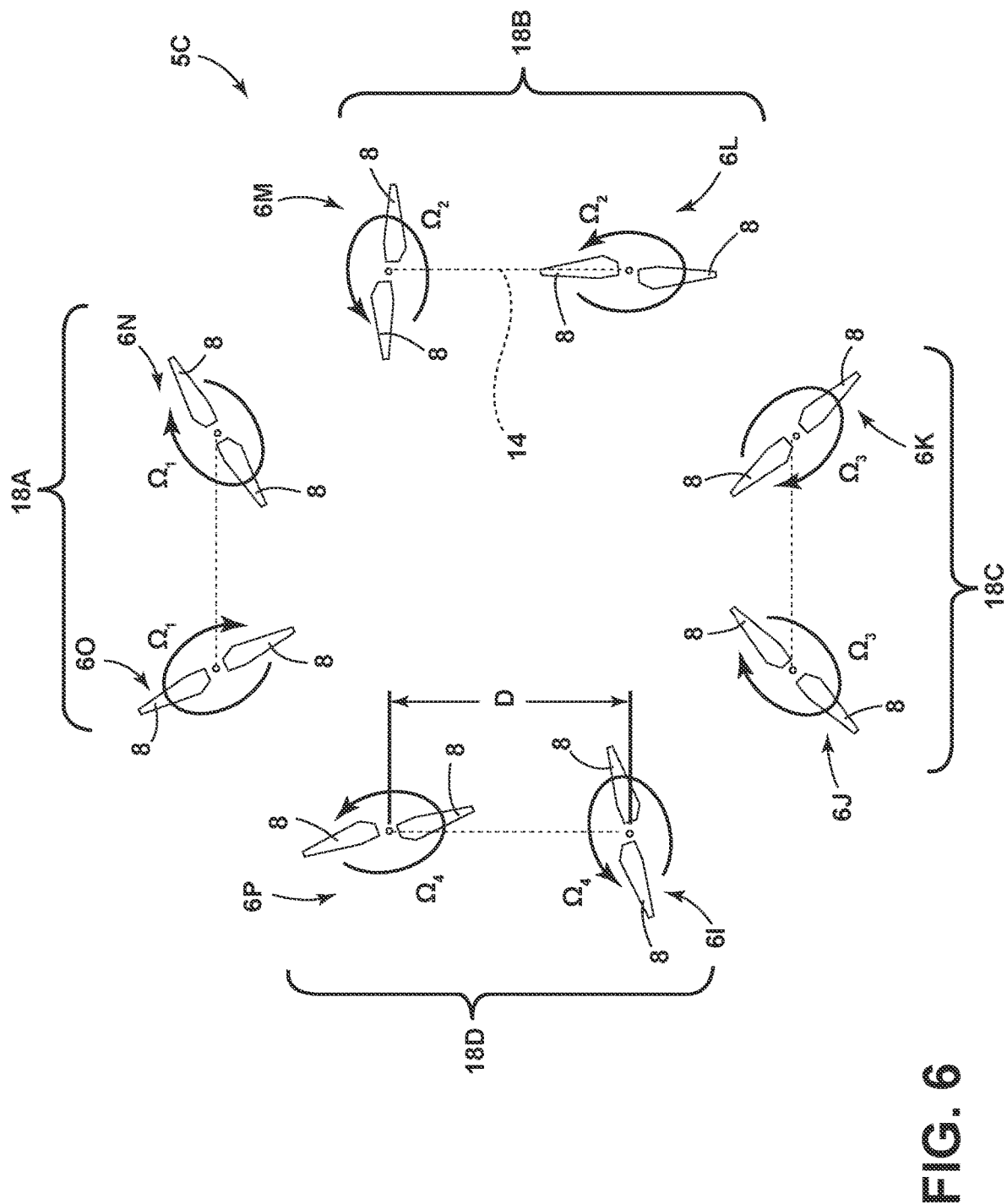
FIG. 6 is a schematic top plan view of a low-noise multi-propeller system according to another aspect of the present disclosure.

With further reference to FIG. 6, a propeller system 5C according to another aspect of the present disclosure includes multiple pairs of phase-locked propellers (i.e., pair 18A comprises propellers 6O and 6N, pair 18B comprises propellers 6M and 6L). The propellers of each pair (e.g., propellers 6O and 6N of pair 18A at $\Omega_1$) are depicted as phase-locked offset at about 90-degrees relative, and rotate in the same clockwise direction at substantially the same rotation rates $\Omega_1$, $\Omega_2$, $\Omega_3$, and $\Omega_4$. Other pairs of propellers (e.g. pair 18B comprises propellers 6L and 6M) are also phase-locked and rotate in the same counterclockwise direction at a rotational rate $\Omega_2$. The rotational rates of the propellers in each pair are substantially equal. However, the rotational rates of the pairs are typically not equal because the rotational rates are independently controlled. Thus, the rotational rates $\Omega_1$, $\Omega_2$, $\Omega_3$, and $\Omega_4$ may be equal under certain flight conditions, but each of the rotational rates $\Omega_1$, $\Omega_2$, $\Omega_3$, and $\Omega_4$ are independently controlled to provide for controlled flight of the aerial vehicle and the rotational rates $\Omega_1$, $\Omega_2$, $\Omega_3$, and $\Omega_4$ are therefore not necessarily equal. Each of the propellers 6I-6P includes two blades 8, and the propellers within each pair have 90-degree phase offsets. Propellers within each pair are spaced-apart by a distance D. The propellers 6I-6P may have substantially identical configurations, and each propeller may include 3, 4, 5, or more blades. The propeller system 5C could have 1, 2, 3, or more pairs of phase-locked propellers. Each pair of phase-locked propellers may be independently controlled.

Figure 7:
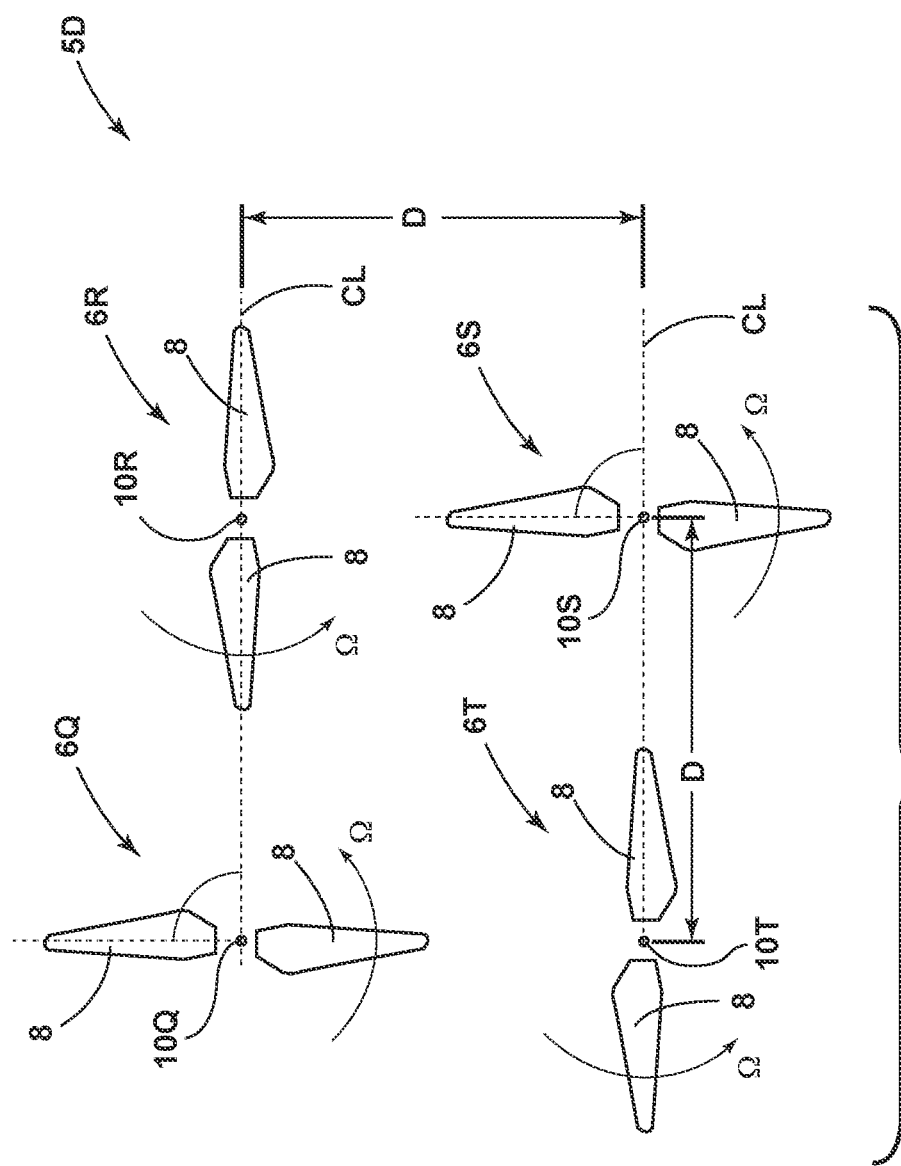
FIG. 7 is a schematic top plan view of a low-noise multi-propeller system according to another aspect of the present disclosure.

With further reference to FIG. 7, a propeller system 5D according to another aspect of the present disclosure includes four propellers 6Q-6T that are spaced-apart a distance D in a substantial quadrilateral (e.g. square) pattern. Each propeller includes two blades 8, and adjacent propellers have 90-degree phase offsets. The propellers 6Q-6T corotate in the same direction, preferably at the same rotational rates or substantially the same rotational rate or speed. The propellers 6Q-6T may have 3 or more blades, and the phase offset could vary from the preferred 90-degree phase offset.

With further reference to FIG. 7A, a propeller system 5E includes first, second, and third propellers 6E1-6E3, respectively, that rotate about (or are configured to define) axes of rotation 10E1-10E3, respectively. Propellers 6E1-6E3 may be substantially identical. The axes 10E1-10E3 are arranged in a triangular pattern and are spaced-apart relative to one another a distance D that is preferably less than one half of an acoustic wavelength of the fundamental tone. The propellers 6E1-6E3 are all phase-locked and rotate in the same rotational direction preferably at about the same rotational rate. Each of the propellers 6E1-6E3 includes two blades 8. The propellers 6E1-6E3 preferably have a phase offset of about 60-degrees relative to adjacent propellers.

The preferred phase offset for propellers aligned linearly, as shown in FIGS. 3, 4, and 5 for example, is: $\Delta\psi = 180°/N_b$, where $N_b$ is the number of blades. The preferred offset is the same for other phase-locked propeller systems containing an even number of propellers that are not aligned linearly, as shown in FIG. 7 for example. If the propeller system includes an odd number of propellers positioned near the vertices of a normal polygon (i.e. triangle, pentagon, etc.), as shown in FIG. 7A for example, the preferred phase offset angle for adjacent propellers is: $\Delta\psi_r = 180°/N_b - 180°/(N_p N_b)$ where $N_b$ is the number of blades and $N_p$ is the number of propellers. In all cases, a separation distance D between adjacent propellers is preferably less than one half of an acoustic wavelength of the fundamental tone and the propellers rotate in the same direction at about the same rotational rate.

With further reference to FIG. 7B, a propeller system 5F according to another aspect of the present disclosure includes a plurality of propellers 6. The propellers are organized in groups 15 of three that are phased-locked and rotate in the same direction at substantially the same rotational rate. Propellers 6 within each of groups 15 are arranged substantially in a triangular pattern 14. Adjacent groups 15 of propellers may rotate in a different direction (e.g. counterclockwise instead of clockwise) and at a different rotational rate or speed. Each of the propellers 6 of FIG. 7A includes two blades 8, and propellers 6 within each group 15 preferably have a phase offset of about 60-degrees relative to other propellers 6 in the group 15. Propellers 6 may have substantially identical configurations, and each propeller 6 may include 3, 4, 5, or more blades 8. Adjacent propellers 6 within each group are spaced-apart a distance D that is preferably less than one half of an acoustic wavelength of the fundamental tone at the blade passage frequency. The propeller system 5F could have 1, 2, 3, or more groups 15 of phase-locked propellers 6. In general, the rotational rate of the propellers 6 in a particular group 15 are equal, but the rotational rate of each group 15 may be independently controlled such that the rotational rates $\Omega_1$-$\Omega_6$ are not necessarily equal.

Figure 8:
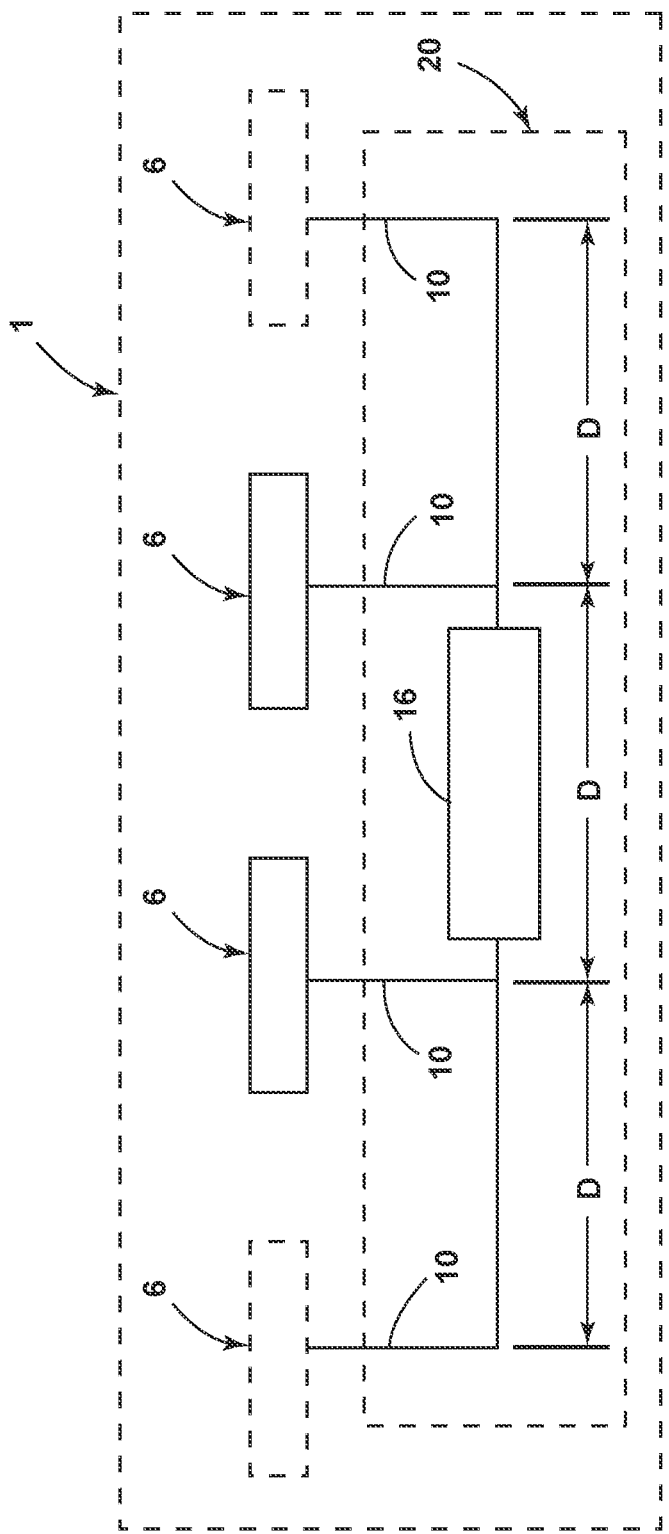
FIG. 8 is a side elevational schematic showing an aerial vehicle including a low-noise multi-propeller system according to another aspect of the present disclosure.

In general, within an aerial vehicle for example, a drive system 16 may be configured to corotate the at least two propellers 6 at substantially equal rotational rates in a first direction, wherein the drive system 16 is configured to substantially phase-lock the at least two propellers 6 at a predefined relative phase offset to reduce radiated sound power at a blade passage frequency. FIG. 8 is a schematic view of a device 1 according to another aspect of the present disclosure. Device 1 may comprise an aerial vehicle having a vehicle body or a portion of a body of an aerial vehicle (e.g. one of aerial vehicles 1A-1G in FIG. 1) or other device. Device 1 includes a multi-propeller system 20 having at least two propellers 6 that are operably connected to a drive system 16 that, when powered, corotates the propellers 6. The system 20 may include more than two propellers 6, and optional additional propellers 6 are shown in dashed lines. The powered drive system 16 is configured to phase-lock the propellers 6, whereby adjacent propellers 6 corotate at a predefined relative angular phase offset. Each propeller 6 preferably includes at least two blades 8 (see, e.g., FIGS. 2-7B), and each propeller 6 preferably has an equal number of blades 8 having substantially the same or identical size, shape and configuration. The powered drive system 16 may comprise a phase-locked mechanical drive that provides a predefined relative phase offset for adjacent propellers 6. For example, the powered drive system 16 may include gears, pulleys and belts, or other mechanical elements that cause propellers 6 to rotate at substantially the same rotational rate at a predefined relative phase offset in the same rotational direction (clockwise or counterclockwise). Alternatively, the powered drive system 16 may include an electronic controller that provides a phase lock between the propellers 6 to maintain a predefined relative phase offset. For example, electronic controllers of the type utilized for turbo prop aircraft engines may provide a predefined phase-lock between the propellers 6. The propellers 6 may be arranged in a variety of configurations as shown in, for example, FIGS. 1-7B. However, numerous additional configurations are also possible and the present disclosure is not limited to the configurations of FIGS. 1-7B. Also, the propellers 6 may each include two blades, three blades, four blades, or more. Each of the propellers 6 of the multi-propeller system 20 preferably includes an equal number of blades 8, wherein the blades 8 have substantially the same or identical sizes and shapes. In general, if the propellers are arranged in a line, or if there is an even number of phase-locked propellers, then the preferred predefined relative phase offset of adjacent propellers 6 is about equal to 180-degrees divided by the number of blades 8 of each propeller 6. In general, if there is an odd number of phase-locked propellers 6 positioned near the vertices of a normal polygon (i.e. triangle, pentagon, etc.), the preferred phase offset angle for adjacent propellers is about equal to 180-degrees divided by the number of blades 8 of each propeller 6 minus 180-degrees divided by the product of the number of blades 8 of each propeller 6 and the number of phase-locked propellers, $\Delta\psi_r=180°/N_b-180°/(N_pN_b)$. It will be understood that the relative phase does not necessarily need to be equal to the preferred phase offset. The distances D between adjacent propellers 6 may be substantially equal as shown in FIG. 8, or the distances D between adjacent propellers 6 may be unequal.

Each of the propellers 6 are configured to rotate about or define an axis of rotation 10. The axes 10 of the propellers 6 are preferably parallel, substantially or approximately parallel, and the axes 10 may be positioned in a nearly upright or vertical orientation to provide lift during vertical flight, including vertical take-off and/or landing. The axes 10 may also be positioned in a nearly horizontal orientation to provide thrust in forward flight. However, it will be understood that the axes 10 may be in other orientations as well, such as for horizontal flight. It will be understood that FIG. 8 is a schematic drawing that is not limited to any of the specific configurations shown in FIGS. 1-7B.

The at least two propellers in the various embodiments define an angular phase relative to one another. As discussed above, the angular phase offset is uniquely defined based on the number of blades 8 of each propeller 6 and in some cases the number of phase-locked propellers to achieve a global (i.e. averaged in all directions) reduction of the fundamental tone at the blade passage frequency. The phase offset does not depend on the rotation rate, blade geometry, or other aspects of the vehicle design (except the blade count, and number and location of the propellers). The relative angular phase offset is uniquely determined based on the vehicle configuration (i.e. based on whether the propellers have two blades, three blades, four blades, or more, and on the number of phase-locked propellers), and the preferred relative phase offset is not changed based on the rotation speed or operating conditions of the vehicle 1A-1G of FIG. 1. As also discussed above, the rotation speed and phase relationship is fixed by the drive or control mechanism 16.

Noise reduction (i.e., a reduction in radiated sound power) is achieved due to the near-field acoustic interaction between the propellers 6. Specifically, two propellers 6 that are phased appropriately behave similar to an acoustic dipole, which radiates less efficiently than a single acoustic source (e.g., a monopole). It will be understood that there are other distributions of acoustic sources that radiate even less efficiently, such as a quadrupole. Numerical simulations show that sets of four propellers 6 (e.g. FIGS. 5 and 7) yield less total noise at the blade passage frequency than a single propeller, with four times more thrust than a single propeller. It is believed that this low-noise effect may be achieved in an aerial vehicle 1B (FIG. 1) and similar aerial vehicles if the four (or more) propellers 2A on each wing 4 are phase-locked as shown in FIG. 5.

The disclosure herein is thus applicable to systems implemented within aerial vehicles having bodies such as those shown in FIG. 1. However, the noise reduction of the present disclosure is also applicable to other propeller, rotor, or fan applications, particularly when low-frequency tonal noise is dominant. For example, the rotational rate and phase could be controlled to provide noise reduction according to the present disclosure in cooling fans of computers or other consumer electronics. Rotation and relative phase angle of adjacent wind turbines could also be controlled as described herein to provide noise reduction according to the present disclosure. The present approach also extends to methods of reducing noise in multi-propeller systems, as described above, by causing at least two propellers having equal numbers of blades to rotate or corotate in a first direction at substantially equal rotational rates and phase-locking the at least two propellers at a relative phase offset that reduces radiated sound power at a blade passage frequency due to near field interaction.

The near-field acoustic interaction between adjacent sets of propellers 6 reduces the radiation efficiency of the multi-propeller system 20, resulting in less radiated sound power. The total power output for two independent acoustic sources with the same source strength is two times larger (3 dB higher) than the power output for a single source. However, if two sources are located close together, the pressure field of one source modifies the sound power output of the second source, and vice-a-versa. The interaction between the two sources does not change the source strength (i.e. volume velocity) of either source, but instead modifies the radiation efficiency of the source (i.e. it affects how efficiently the mechanical energy is converted to acoustic energy). In general, this is why an acoustic dipole radiates less efficiently than a single monopole.

Figure 10:
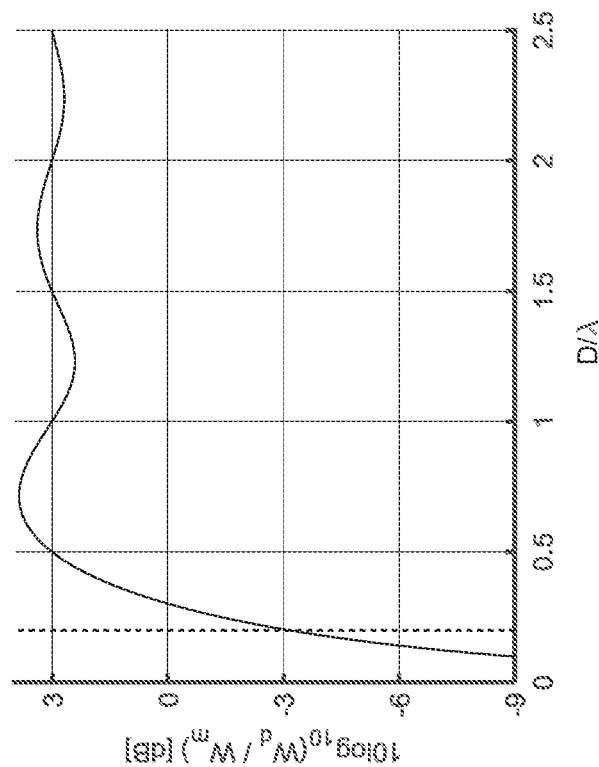
FIG. 10 is a graph showing the ratio of the logarithmic power output of a dipole relative to the power output of a monopole.
Figure 9:
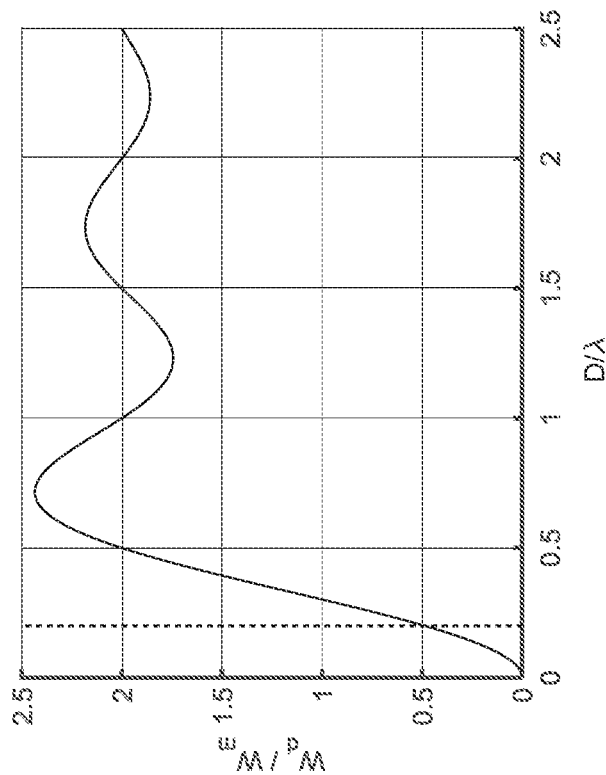
FIG. 9 is a graph showing the ratio of the power output of a dipole relative to the power output of a monopole.

A dipole consists of two monopoles separated by a distance D with the same source strength but opposite phase. For example, FIGS. 9 and 10 comprise calculated (simulated) results showing the ratio of the sound power output of a dipole relative to a monopole. In FIGS. 9 and 10, D is the separation distance between the sources (for the dipole) and $\lambda$ is the acoustic wavelength. The vertical line indicates the D/$\lambda$ used in an operational test. FIGS. 9 and 10 show that when the separation distance D is much less than the acoustic wavelength $\lambda$, the dipole radiates less efficiently than a monopole (i.e. the ratio is less than 1). As the separation distance D increases relative to the acoustic wavelength $\lambda$, the ratio of the sound power output of a dipole relative to a monopole asymptotes to 2 (+3) dB. Thus, at large separation distances, the power output of the dipole is twice as much as the monopole, which is an intuitive result for two independent sources. Similar plots can be generated for other inefficient radiators, such as linear and lateral quadrupoles. For these configurations, the power output can be reduced even further. Accordingly, the benefits associated with the present disclosure are not limited to systems having only two propellers.

The effect illustrated in FIGS. 9 and 10 is believed to be generally known for simple acoustic sources. However, this effect is not believed to have been previously demonstrated for more complex sources, such as propellers. The curve in FIGS. 9 and 10 represent the best case, for two identical out-of-phase sources. In order to test the dipole effect in propellers, testing was conducted utilizing two propellers rotating at a rotational rate of approximately 5,100 RPM with a blade passage frequency of 170 Hz, and a hub-to-hub separation of 0.40 m (15.75 inches). At 170 Hz, the acoustic wavelength is approximately 2 m, and therefore the ratio of the separation distance to the acoustic wavelength is 0.2. In this case, the power radiated by a dipole would be one half, the power of a single monopole (3 dB down) or one quarter, the power of two monopoles (6 dB down). As discussed below in connection with Table 1, the actual benefit (noise reduction) measured during testing was somewhat less than the ideal case for two point sources, but the noise reduction was nevertheless significant.

Table 1 comprises measured test results and predicted results for a two propeller system having generally the same configuration as shown in FIG. 3. Specifically, Table 1 comprises thrust, measured change in radiated sound power, and numerically predicted change in radiated sound power. Table 1 shows the change in radiated sound power for configurations 1 and 3-7 relative to configuration 2 (two independent propellers).

TABLE 1

Thrust and radiated sound power (at the blade passage frequency) relative to configuration 2.

| Propeller Configuration | Measured thrust, (% rel. config 2) | Measured change in sound power, (dB rel. config 2) | Predicted change in sound power, (dB rel. config 2) |
|---|---|---|---|
| 1: Single | 50 | −3.0 | −3.0 |
| 2: Pair, not phase-locked | 100 | 0.0 | 0.0 |
| 3: Pair, counterrotating, $\Delta\psi = 0°$ | 95 | +0.4 | +0.2 |
| 4: Pair, counterrotating, $\Delta\psi = 90°$ | 100 | −0.3 | −0.1 |
| 5: Pair, corotating, $\Delta\psi = 0°$ | 100 | +2.5 | +2.3 |
| 6: Pair, corotating, $\Delta\psi = 45°$ | 100 | −0.2 | −0.1 |
| 7*: Pair, corotating, $\Delta\psi = 90°$ | 100 | −5.8 | −5.2 |

*Preferred configuration

The testing showed that the actual (measured) sound power radiated by two corotating propellers that are phase-locked at a 90-degree relative phase (configuration 7) was 2.8 dB less than the sound power from a single propeller (configuration 1), and 5.8 dB less than the sound power from two independent propellers (configuration 2). In general, the near-field effect (noise reduction) is significant if the hub-to-hub separation D is less than one half of the acoustic wavelength at the tonal frequency of interest (this will typically be the blade passage frequency).

Table 1 demonstrates that corotating propellers at a selected predefined relative phase (90° for a pair of propellers with two blades each) significantly reduces the radiated sound power compared to two propeller systems that are not corotating and/or not phase-locked. The measurements were integrated over a measurement grid, which covers a significant portion of a hemisphere below the propeller system. The sound power of Table 1 includes all power within 10 Hz of the blade passage frequency. As shown in Table 1, tests were performed with individual propellers, and also with two phase-locked propellers at various relative phases. The values are normalized by configuration 2, which gives the radiated power from two propellers that are not phase-locked. Because the propellers used in the test had identical rotation rates, configuration 2 could not be measured directly, but rather had to be simulated from configuration 1. Specifically, configuration 2 corresponds to two propellers with slightly different rotational rates (5,100 RPM and 5,250 RPM for example) and corresponding blade passage frequencies (170 Hz and 175 Hz). As shown in Table 1, the tonal radiated sound power is reduced by 5.8 dB over the measurement grid when the relative phase between the two propellers is 90-degrees (configuration 7). 90-degrees is the optimal phase angle to reduce the tonal noise at the blade passage frequency for a pair of two-bladed propellers.

The third column in Table 1 shows calculated predictions corresponding to each test configuration. Specifically, predictions were generated for individual propellers using the Propeller Analysis System (PAS) module within the NASA Aircraft NOise Prediction Program (ANOPP). After generating predictions for individual propellers, the pressure fields were combined to predict the far-field pressure for the two-propeller system. The far-field intensity was then integrated over a hemisphere below the two propeller systems to predict the radiated sound power. The change in sound power was then calculated relative to configuration 2 which was calculated by adding 3 dB to the isolated propeller case (configuration 1) to account for a second incoherent source. The model predicts the same noise reduction effect for configuration 7. Specifically, the radiated sound power is significantly reduced when the two propellers are corotating with a relative phase of 90-degrees.

Figure 11:
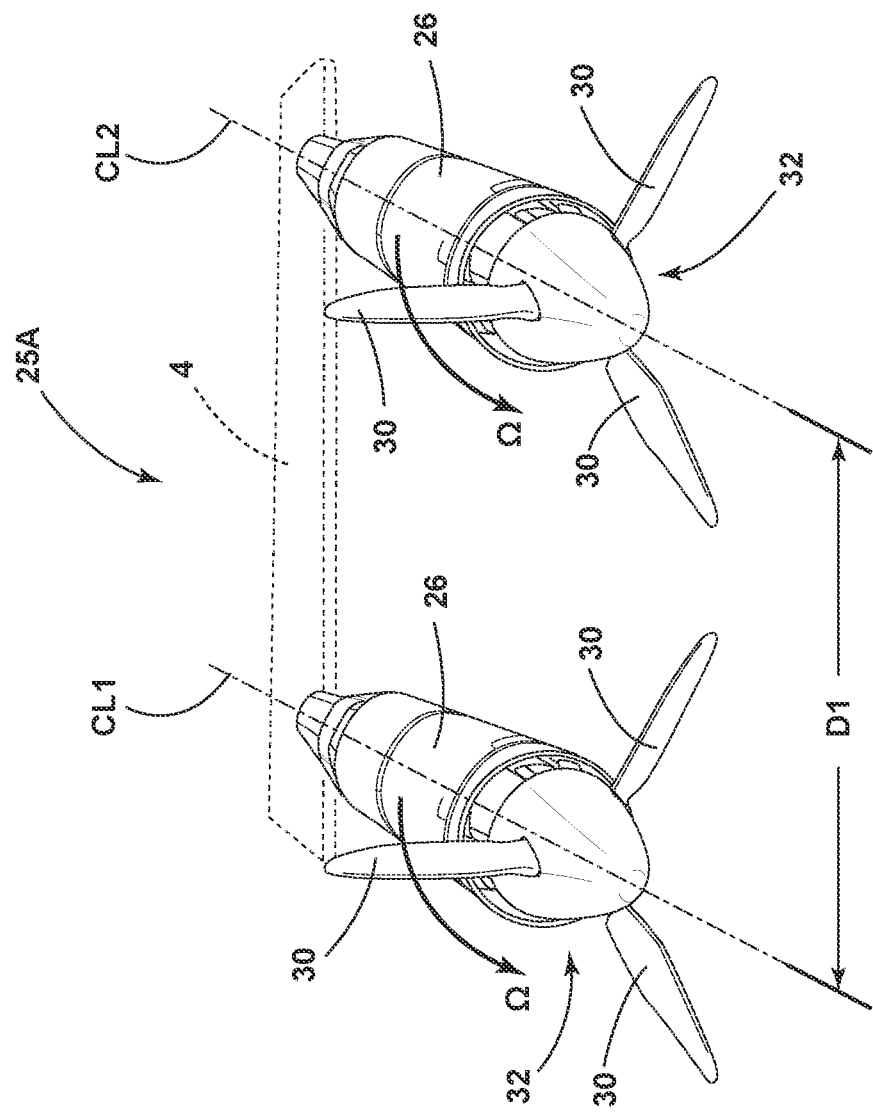
FIG. 11 is a partially schematic isometric view showing a propeller configuration.

As described above, the principles of the present approach extend to non-vertical orientations. With further reference to FIG. 11, noise reduction according to the present disclosure may also be utilized in connection with propeller configuration 25C for substantially level (horizontal) flight. The configuration 25C includes motors 26 that drive propellers 32 having three blades 30. The center lines CL1 and CL2 of the motors 26 and propellers 32 of configuration 25C are spaced apart a distance "D3" on a wing 4. In general, testing of configuration 25C indicates that significant reductions in acoustic noise can be achieved if the blades 30 of the adjacent propellers 32 are phase-locked at a predefined phase offset equal to 60-degrees (i.e. 180-degrees divided by the number of blades (3) of each propeller 32).

The preceding description of the disclosed embodiments is provided to enable any person skilled in the art to make or use the present systems and methods. Various modifications to these embodiments will be readily apparent to those skilled in the art, and the generic principles defined herein may be applied to other embodiments without departing from the spirit or scope. Thus, the description of the present approach is not intended to be limited to the embodiments shown herein but is to be accorded the widest scope consistent with the following claims and the principles and novel features disclosed herein.

What is claimed is:

1. A low-noise multi-propeller system for aerial vehicles comprising:
   at least two propellers, each propeller configured to define an axis of rotation and having at least two blades, the at least two propellers having an equal number of blades, wherein the at least two propellers define an angular phase relative to one another;
   a drive system configured to corotate the at least two propellers at substantially equal rotational rates in a first direction, wherein the drive system is configured to substantially phase-lock the at least two propellers at a predefined relative phase offset to reduce radiated sound power at a blade passage frequency, wherein the radiated sound power is the total energy radiated in all directions per unit time.

2. The multi-propeller system of claim 1, wherein:
   the predefined relative phase offset is substantially equal to 180-degrees divided by the number of blades of the at least two propellers.

3. The multi-propeller system of claim 1, wherein:
   the predefined relative phase offset is substantially equal to the difference of 180-degrees divided by the number of blades of the at least two propellers and 180-degrees divided by the product of the number of blades of the at least two propellers and the number of propellers.

4. The multi-propeller system of claim 1, wherein:
   the axes of rotation of the at least two propellers are substantially parallel.

5. The multi-propeller system of claim 4, wherein:
   the at least two propellers consists of two propellers.

6. The multi-propeller system of claim 5, wherein:
   the axes of the two propellers are spaced-apart a distance that is less than one half an acoustic wavelength of a fundamental tone at the blade passage frequency.

7. The multi-propeller system of claim 1, wherein:
   the at least two propellers have substantially identical sizes and shapes.

8. The multi-propeller system of claim 1, wherein:
   the at least two propellers consists of three propellers.

9. The multi-propeller system of claim 8, wherein:
   the three propellers are arranged in a triangle.

10. The multi-propeller system of claim 1, wherein:
    the at least two propellers consists of four propellers.

11. The multi-propeller system of claim 10, wherein:
    the four propellers are arranged linearly.

12. The multi-propeller system of claim 1, wherein:
    the multi-propeller system is configured to provide thrust for an aerial vehicle for at least one of 1) vertical take-off and/or landing; and 2) horizontal flight.

13. The multi-propeller system of claim 1, wherein:
    the at least two propellers are mounted to a wing of an aerial vehicle.

14. An aerial vehicle comprising:
    a vehicle body;
    a low-noise multi-propeller system having at least two non-overlapping propellers, each propeller configured to define an axis of rotation and having at least two blades, the at least two propellers having an equal number of blades, wherein the at least two propellers define an angular phase relative to one another and the axes of the two propellers are substantially parallel;
    a powered drive system corotating the at least two propellers at substantially equal rotational rates in a first direction, wherein the drive system phase-locks the at least two propellers at a predefined relative phase offset, wherein the predefined relative phase offset is specifically precalculated to reduce radiated sound power at a blade passage frequency relative to a radiated sound power at a blade passage frequency of the at least two propellers when the at least two propellers are not phase-locked, wherein the radiated sound power is the total energy radiated in all directions per unit time and wherein the axes of the at least two propellers are spaced-apart a distance that is less than one half an acoustic wavelength of a fundamental tone at a blade passage frequency.

15. The aerial vehicle of claim 14, wherein;
    the predefined relative phase offset is substantially equal to 180-degrees divided by the number of blades of the at least two propellers.

16. The aerial vehicle of claim 14, wherein;
    the at least two propellers comprises an odd number of propellers positioned near the vertices of a normal polygon, and the predefined relative phase offset $\Delta \psi_r$ is substantially equal to the difference of 1) 180-degrees divided by the number of blades of the at least two propellers and 2) 180-degrees divided by the product of the number of blades of the at least two propellers and the number of propellers $(N_p N_b)$, according to $\Delta \psi_r = 180°/N_b - 180°/(N_p N_b)$.

17. The aerial vehicle of claim 14, wherein:
    the aerial vehicle comprises a multicopter having a plurality of groups of propellers, each group of propellers comprising at least two phase-locked propellers.

18. The aerial vehicle of claim 17, wherein;
    the rotational rate of each group of propellers is independently controlled.

19. An aerial vehicle comprising:
    a vehicle body;
    a low-noise multi-propeller system having at least two propellers, each propeller configured to define an axis of rotation and having at least two blades, the at least two propellers having an equal number of blades, wherein the at least two propellers define an angular phase relative to one another and the axes of the two propellers are substantially parallel;

a powered drive system configured to corotate the at least two propellers at substantially equal rotational rates in a first direction, wherein the drive system is configured to phase-lock the at least two propellers at a predefined relative phase offset, wherein the predefined relative phase offset reduces total energy radiated in all directions per unit time at a blade passage frequency, and wherein:

the axes of the at least two propellers are spaced-apart a distance that is less than one half an acoustic wavelength of a fundamental tone at a blade passage frequency.

20. The aerial vehicle of claim 14, wherein:

none of the blades of the at least two propellers overlap.

21. The aerial vehicle of claim 20, wherein:

the powered drive system comprises a phase-locked mechanical drive that drives the at least two propellers at the predefined relative phase offset.

* * * * *